United States Patent [19]

Dorfschmidt

[11] Patent Number: 5,989,631
[45] Date of Patent: *Nov. 23, 1999

[54] PROCESS FOR EQUIPPING A KITCHENWARE OBJECT WITH AN ANTI-ADHESION COATING

[75] Inventor: Klaus Dorfschmidt, Frauenberg, Germany

[73] Assignee: Fissler GmbH, Idar-Oberstein

[*] Notice: This patent issued on a continued prosecution application filed under 37 CFR 1.53(d), and is subject to the twenty year patent term provisions of 35 U.S.C. 154(a)(2).

[21] Appl. No.: 08/860,693

[22] PCT Filed: Nov. 8, 1995

[86] PCT No.: PCT/EP95/04389
§ 371 Date: Aug. 5, 1997
§ 102(e) Date: Aug. 5, 1997

[87] PCT Pub. No.: WO96/18333
PCT Pub. Date: Jun. 20, 1996

[30] Foreign Application Priority Data

Dec. 16, 1994 [DE] Germany ............... 44 45 007

[51] Int. Cl.⁶ ............... B05D 7/22; B05D 1/36; C25D 11/04
[52] U.S. Cl. ............... 427/239; 427/282; 427/402; 427/419.2; 427/419.5; 205/171; 205/172; 205/221
[58] Field of Search ............... 427/239, 282, 427/419.2, 402, 419.5; 205/221, 171, 172

[56] References Cited

U.S. PATENT DOCUMENTS

| | | | |
|---|---|---|---|
| 3,788,513 | 1/1974 | Racz | 220/64 |
| 3,861,951 | 1/1975 | Staniland et al. | 117/161 R |
| 4,210,499 | 7/1980 | Hirono et al. | 204/38 A |
| 4,347,722 | 9/1982 | Ulam | 72/63 |
| 4,568,573 | 2/1986 | Sunada et al. | 427/350 |
| 4,877,758 | 10/1989 | Lee et al. | 501/24 |
| 5,411,014 | 5/1995 | Paul | 126/390 |
| 5,471,731 | 12/1995 | Welhouse | 29/527.4 |

FOREIGN PATENT DOCUMENTS

| | | |
|---|---|---|
| 0 424 072 A1 | 4/1991 | European Pat. Off. . |
| 0 594 374 A1 | 4/1994 | European Pat. Off. . |
| 1546934 B2 | 10/1970 | Germany . |
| 1546966 | 10/1970 | Germany . |
| 2 009 959 | 9/1971 | Germany . |
| 3244217 A1 | 5/1984 | Germany . |
| 3604762 C2 | 1/1987 | Germany . |
| 3806699 A1 | 9/1989 | Germany . |
| 1 069 168 | 12/1954 | United Kingdom . |
| 1069168 | 5/1967 | United Kingdom . |
| 719 383 | 5/1967 | United Kingdom . |

OTHER PUBLICATIONS

H. Simon/M. Thoma, Angewandte oberflachentechnik fur metallische Werkstoffe, 1985, p. 4.

*Primary Examiner*—Shrive Beck
*Assistant Examiner*—Michael Barr
*Attorney, Agent, or Firm*—Wenderoth, Lind & Ponack, L.L.P.

[57] ABSTRACT

The invention relates to a process for equipping a kitchenware object, for example a pan, a pot, roasters or the like, comprising metal, for example aluminum, an aluminum alloy, magnesium or a magnesium alloy, with an anti-adhesion coating in the stressed surface regions, for example, on the inside, in which onto the metal surface of the object, for example after roughening, a mechanically-resistant layer, such as a mechanically-resistant anodization layer or similar mechanically-resistant layer is provided, and subsequently the stressed surface regions are provided with the anti-adhesion layer, wherein, before providing the mechanically-resistant layer, a durable surface layer is applied onto the surface regions, not to be provided with the coating system (mechanically-resistant layer or the like with or without anti-adhesion layer), of the object.

4 Claims, No Drawings

PROCESS FOR EQUIPPING A KITCHENWARE OBJECT WITH AN ANTI-ADHESION COATING

The invention relates to a process for equipping a kitchenware object, for example a pan, a pot or the like, comprising metal, for example aluminum, an aluminum alloy, magnesium or a magnesium alloy and/or copper alloy, with an anti-adhesion coating system in the stressed surface regions, for example on the inside, which, for example after roughening, comprises a layer of a mechanically-resistant material such as a mechanically-resistant anodization layer or similar anodization layer, and an anti-adhesion layer, comprising for example a fluorocarbon resin, such as polytretafluoro [SIC] ethylene (PTFE), tetrafluoro ethylene-hexafluoro propylene copolymer (FEP) or tetrafluoro ethylene-ethylene copolymer (ETFE), thereby that before providing the layer of mechanically-resistant material a surface layer is applied onto the surface regions of the kitchenware object not to be provided with the anti-adhesion coating system and subsequently the layer of mechanically-resistant material is provided as an anodically-generated conversion layer.

Such process is disclosed in GB-A-1 069 168. From it is evident that in the production of a test pan initially in a partial region of the pan body a protection coat is provided while the exposed metal surface region is provided with an intermediate oxide layer. For demonstration purposes, a partial region of this intermediate oxide layer again is provided with a protection coat while the exposed intermediate oxide layer is provided with an additional resin layer. After stripping off the two protection coats, the different surface properties of the untreated metal surface of the metal surface provided only with one intermediate oxide layer and the smooth surface provided additionally with a resin layer can be demonstrated.

According to a process disclosed in DE-B-1 546 934 and EP-A-0 424 072, kitchenware objects, such as pans, pots, roasters or the like, to some extent for increasing the scratch and wear resistance on their stressed inside, are provided with layers comprising mechanically-resistant material in combination with anti-adhesion layers. In the case of aluminum or magnesium alloys one possibility for applying a layer comprising mechanically-resistant material is the anodic oxidation according to DE-A-3 244 217. As a rule, the object to be anodized for this purpose must be immersed in an acidic electrolyte bath while electrically connected and subsequently coated in the current flow with a conversion layer. In this process the entire object is provided on the inside as well as on the outside with the layer of mechanically-resistant material.

In DE-A-3 806 699 is disclosed a process for coating household objects, in which the basic metal body is initially provided with a foundation adhesion layer, for example comprising nickel-aluminum or chromium-nickel. Onto this foundation adhesion layer is applied a layer comprising a mechanically-resistant material, for example comprising aluminum oxide or a mixture of aluminum oxide and titanium oxide is applied. Subsequently, the layer comprising the mechanically-resistant material is provided with an anti-adhesion layer, for example based on polytetrafluoro ethylene (PTFE). Each of the particular layers is therein sprayed onto the frying surface. In this process the optical quality of the surface is said to be retained compared to prior known coating processes and that simultaneously the load-ability of the layer is further increased.

DE-C-3 604 762 also discloses a process for coating kitchen containers, in which the surface is initially provided in the plasma spraying process with a foundation adhesion layer comprising nickel-aluminum or chromium-nickel, subsequently during the plasma spraying process onto the foundation adhesion layer a layer comprising a mechanically-resistant material of aluminum oxide or aluminum oxide/titanium oxide is applied, furthermore onto the layer of mechanically-resistant material [of: SIC] an anti-adhesion layer is applied and lastly the anti-adhesion layer is burned in. The foundation adhesion layer comprises nickel-aluminum or chromium-nickel. The required layers are here also only sprayed onto the stressed surface, thus for example only [onto] the inner frying surface of a pan. In this process, compared to previously known coating processes, the task intended to be solved is that of attaining improved adhesion of the anti-adhesion layer on the surface of the kitchen container.

It is the task of the present invention to implement a process of the initially cited type such that it can be carried out more economically.

This task is solved with the invention in a process of the initially cited type essentially with the characteristics of claim 1. The process costs are hereby reduced since for example in anodic oxidation, in spite of the immersion of the kitchenware object in the electrolyte bath, only a lesser area fraction is to be provided with the anodization layer. The durable surface layer serves not only for this saving but comprises simultaneously specific functional properties; for, due to the appropriate material selection, it comprise a durable protection, cover, decoration and/or carrier layer for a further final cover layer. Apart from the fact that it can serve a decorative purpose, the surface layer can therein be designed for a special functional purpose, i.e. for improving for example wear resistance, scratch resistance, corrosion protection or thermal conductivity (on the bottom) independently of the coating system to be provided on the inside of the kitchenware object.

As the surface layer are considered according to the invention primarily anti-adhesion lacquer systems, enamelling and/or other acid-resistant organic and/or inorganic coatings. If, for example, fluorocarbon-containing coating systems are used as surface layer, these can be applied as single, double or multiple layers, with or without intermediate drying/intermediate burning. The enamelling can also be applied in single or multiple layers, with or without intermediate drying/intermediate burning, in order to attain optimum acid resistance. The further acid-resistant organic or inorganic coatings can be based on thin- or thick-films with decorative and/or functional properties.

The surface layer is advantageously applied on the entire outside of the kitchenware object so that, due to a reduction to approximately one half of the area fraction to be provided with the anodization layer, the costs can be considerably reduced.

I claim:

1. A process of equipping a metal cooking utensil having an inner surface coming into contact with the food to be cooked or fried with an anti-adhesion coating system, which anti-adhesion coating system comprises an inner scratch and abrasion resistant layer and an outer anti-adhesion layer, which process consists essentially of firstly applying a durable surface layer onto a first surface region of the metal cooking utensil which is not to be provided with the anti-adhesion coating system, subsequently immersing the metal cooking utensil in an acidic electrolytic bath to anodically generate the scratch and abrasion resistant layer onto a second surface region of the metal cooking utensil which includes the inner surface of the metal cooking utensil and excludes the first surface region of the metal cooking utensil provided with the durable surface layer, and subsequently applying the anti-adhesion layer onto the scratch and abrasion resistant layer, wherein the durable surface layer is a protection layer or a cover layer or a decoration layer or a carrier layer for a further layer which is durable during the life of the cooling utensil, provided that the durable surface layer is not enamel.

2. The process as claimed in claim 1, wherein the durable surface layer is comprised of a lacquer coating, an acid resistant organic coating or an acid resistant inorganic coating.

3. The process as claimed in claim 1, wherein the durable surface layer is applied onto the entire outside surface of the metal cooking utensil.

4. The process as claimed in claim 2, wherein the durable surface layer is applied onto the entire outside surface of the metal cooking utensil.

* * * * *